(12) United States Patent
Sawarkar et al.

(10) Patent No.: US 12,271,704 B2
(45) Date of Patent: Apr. 8, 2025

(54) DETECTION OF VERACITY OF RESPONSES IN MACHINE COMPREHENSION QUESTION AND ANSWER MODELS

(71) Applicant: International Business Machines Corporation, Armonk, NY (US)

(72) Inventors: Kunal Sawarkar, Franklin Park, NJ (US); Shivam Raj Solanki, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 17/934,029

(22) Filed: Sep. 21, 2022

(65) Prior Publication Data
US 2024/0095458 A1    Mar. 21, 2024

(51) Int. Cl.
G06F 40/30 (2020.01)
G06F 40/166 (2020.01)
G06F 40/279 (2020.01)
G06F 40/35 (2020.01)
G06F 40/40 (2020.01)
G06F 40/20 (2020.01)

(52) U.S. Cl.
CPC ............ *G06F 40/35* (2020.01); *G06F 40/166* (2020.01); *G06F 40/279* (2020.01); *G06F 40/40* (2020.01); *G06F 40/20* (2020.01); *G06F 40/30* (2020.01)

(58) Field of Classification Search
CPC ........................ G06F 16/24578; G06F 16/3329
See application file for complete search history.

(56) References Cited

U.S. PATENT DOCUMENTS

| 8,554,769 B1 | 10/2013 | Thakur et al. |
| 9,965,548 B2 * | 5/2018 | Haggar ............... G06F 16/3329 |
| 11,024,299 B1 | 6/2021 | Drake et al. |

(Continued)

FOREIGN PATENT DOCUMENTS

WO    2022043512 A1    3/2022

OTHER PUBLICATIONS

Kacupaj, et al., "ParaQA: A Question Answering Dataset with Paraphrase Responses for Single-Turn Conversation," arXiv, Mar. 2021. (Year: 2021).*

(Continued)

*Primary Examiner* — Feng-Tzer Tzeng
(74) *Attorney, Agent, or Firm* — Amin, Turocy & Watson, LLP

(57) ABSTRACT

One or more systems, devices, computer program products and/or computer-implemented methods provided herein relate to determining veracity of answers generated by machine comprehension question and answer models. According to an embodiment, a machine comprehension component can generate a first answer to a query by extracting the first answer from a passage of text corpus. The text corpus alteration component can alter the text corpus one or more times to produce one or more altered text corpora. The machine comprehension component can further extract one or more additional answers to the query from the altered text corpora. A comparison component can determine a veracity score for the first answer based on one or more comparisons of the first answer with the one or more additional answers.

20 Claims, 9 Drawing Sheets

(56) References Cited

U.S. PATENT DOCUMENTS

| | | | | |
|---|---|---|---|---|
| 2006/0078862 | A1* | 4/2006 | Goto | G09B 7/02 |
| | | | | 434/322 |
| 2012/0078612 | A1* | 3/2012 | Kandekar | G06F 3/04842 |
| | | | | 704/9 |
| 2014/0195897 | A1* | 7/2014 | Balinsky | G06F 40/106 |
| | | | | 715/254 |
| 2020/0356615 | A1* | 11/2020 | Galuten | G06Q 10/10 |
| 2021/0374605 | A1 | 12/2021 | Qian et al. | |
| 2022/0114417 | A1 | 4/2022 | Dalli et al. | |

OTHER PUBLICATIONS

Lee, et al., "Learning to Perturb Word Embeddings for Out-of-distribution QA," arXiv, Jun. 2021. (Year: 2021).*

Kacupaj, et al., "ParaQA: A Question Answering Dataset with Paraphrase Responses for Single-Turn Conversation," arXiv, Mar. 2021—reference in the previous Office action. (Year: 2021).*

Lee, et al., "Learning to Perturb Word Embeddings for Out-of-distribution QA," arXiv, Jun. 2021—reference in the previous Office action. (Year: 2021).*

Lee et al. "Learning to perturb word embeddings for out-of-distribution QA." arXiv preprint arXiv:2105.02692 (2021).

Kang et al., "KALA: Knowledge-Augmented Language Model Adaptation." arXiv preprint arXiv:2204.10555 (2022).

Geva et al., "Break, perturb, build: Automatic perturbation of reasoning paths through question decomposition." Transactions of the Association for Computational Linguistics 10 (2022): 111-126.

Aithal et al., "Automatic question-answer pairs generation and question similarity mechanism in question answering system", Appl Intell 51, 8484-8497 (2021).

Rajpurkar et al., "Know what you don't know: Unanswerable questions for SQUAD." arXiv preprint arXiv:1806.03822 (2018).

Petrov et al. "Cognitive Risk Management: Business Applications of NLP Technology" tds, Published in Towards Data Science. https://towardsdatascience.com/cognitive-risk-management-7c7bcfe84219.

Penas et al., "Testing the Reasoning for Question Answering Validation" https://citeseerx.ist.psu.edu/viewdoc/download?doi=10.1.1.96.1256&rep=rep1&type=pdf.

Reddy et al., "Answer Span Correction in Machine Reading Comprehension" https://aclanthology.org/2020.findings-emnlp.226.pdf.

Che et al., "Deception detection approach for data veracity in online digital news: Headlines vs contents" AIP Conference Proceedings 1891, 020036 (2017) https://aip.scitation.org/doi/abs/10.1063/1.5005369.

Yang et al., "Common Sense-Based Reasoning using External Knowledge for Question Answering" https://www.semanticscholar.org/paper/Common-Sense-Based-Reasoning-Using-External-for-Yang-Kang/056238685cf63d4a17934262d1998a6634868c18.

Zola "Simple Question Answering (QA) Systems That Use Text Similarity Detection in Python" KD nuggets. https://www.kdnuggets.com/2020/04/simple-question-answering-systems-text-similarity-python.html.

Talmor et al., "CommonSenseQA: A Question Answering Challenge Targeting Commonsense Knowledge" Mar. 15, 2019. https://arxiv.org/abs/1811.00937.

Garg et al., "AI, you have a lot of explaining to do" Aug. 2, 2021. https://research.ibm.com/blog/explaining-commonsense-ai.

Gan et al., "Improving the Robustness of Question Answering Systems to Question Paraphrasing" https://aclanthology.org/P19-1610.pdf.

Rinaldi et al., "Exploiting Paraphrases in a Question Answering System" https://aclanthology.org/W03-1604.pdf.

Geusau et al., "Evaluating the Robustness of Question-Answering Models to Paraphrased Questions" https://bnaic.iacs.leidenuniv.nl/wordpress/wp-content/uploads/papers/BNAICBENELEARN_2020_Final_paper_83.pdf.

Bernhard et al., "Answering Learners' Questions by Retrieving Question Paraphrases from Social Q&A Sites" https://www.cs.rochester.edu/~tetreaul/Bernhard.pdf.

Kacupaj et al., "ParaQA: A Question Answering Dataset with Paraphrase Responses for Single-Turn Conversation" https://openreview.net/pdf?id=_GmNcCEAea3.

Dong et al., "Learning to Paraphrase for Question Answering" Aug. 20, 2017. https://arxiv.org/abs/1708.06022.

Duclaye et al., "Learning Paraphrases to Improve a Question-Answering System" https://citeseerx.ist.psu.edu/viewdoc/download?doi=10.1.1.14.7864&rep=rep1&type=pdf.

* cited by examiner

| Passage | Query | First Answer | Confidence |
|---|---|---|---|
| On a weekly basis, the organization controlss access to the information system to prevent unauthorized individuals from obtaining the output | How frequently is control prerformed? | Weekly | 99% |

FIG. 3A

| Passage | Query | First Answer | Confidence |
|---|---|---|---|
| The organization controls access to the information system to prevent unauthorized individuals from obtaining the output | How frequently is control prerformed? | Output | 96% |

FIG. 3B

DETECTION OF VERACITY OF RESPONSES IN MACHINE COMPREHENSION QUESTION AND ANSWER MODELS

BACKGROUND

The subject disclosure relates to machine comprehension systems relying on question and answer models, and more specifically, to veracity of output when a text corpus does not contain an answer to a query.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products in accordance with the present invention.

According to an embodiment, a system can comprise a memory that stores computer executable components; and a processor that executes the computer executable components stored in the memory. The computer executable components can comprise: a receiving component that receives a query from a user or other entity; a text corpus alteration component that alters a text corpus to produce one or more altered text corpora; a machine comprehension component that generates a first answer to the query based on the text corpus and generates one or more alternative answers based on the one or more altered text corpora; and a comparison component that compares the first answer with the one or more alternative answers to determine a veracity score for the first answer.

According to another embodiment, a computer-implemented method can comprise receiving, by a system operatively coupled to a processor, a query; generating, by a machine comprehension system, a first answer to the query based on a text corpus; altering, by the system, the text corpus to produce one or more altered text corpora; generating, by the machine comprehension system, one or more alternative answers to the query based on the one or more altered text corpora; and comparing, by the system, the first answer with the one or more alternative answers to determine a veracity score for the first answer.

According to still another embodiment, a computer program product for facilitating determining the veracity of machine comprehension question and answer models can comprise a computer readable storage medium having program instructions embodied therewith. The program instructions can be executable by a processor to receive, by the processor, a query; generate, by the processor, a first answer to the query based on a text corpus from a machine comprehension system; alter, by the processor, the text corpus to produce one or more altered text corpora; generate, by the processor, one or more alternative answers to the query based on the one or more altered text corpora from a machine comprehension system; and compare, by the processor, the first answer and the one or more alternative answers to determine a veracity score for the first answer.

DESCRIPTION OF THE DRAWINGS

FIG. 3A illustrates a non-limiting example of a text corpus captured by a machine comprehension system, a query that is input of the machine comprehension system, an answer that is output of the machine comprehension system, and a confidence score for the answer.

FIG. 3B illustrates a non-limiting example of a text corpus captured by a machine comprehension system, a query that is input of the machine comprehension system, an answer that is output of the machine learning system, and a confidence score for the answer.

DETAILED DESCRIPTION

Figure 1:
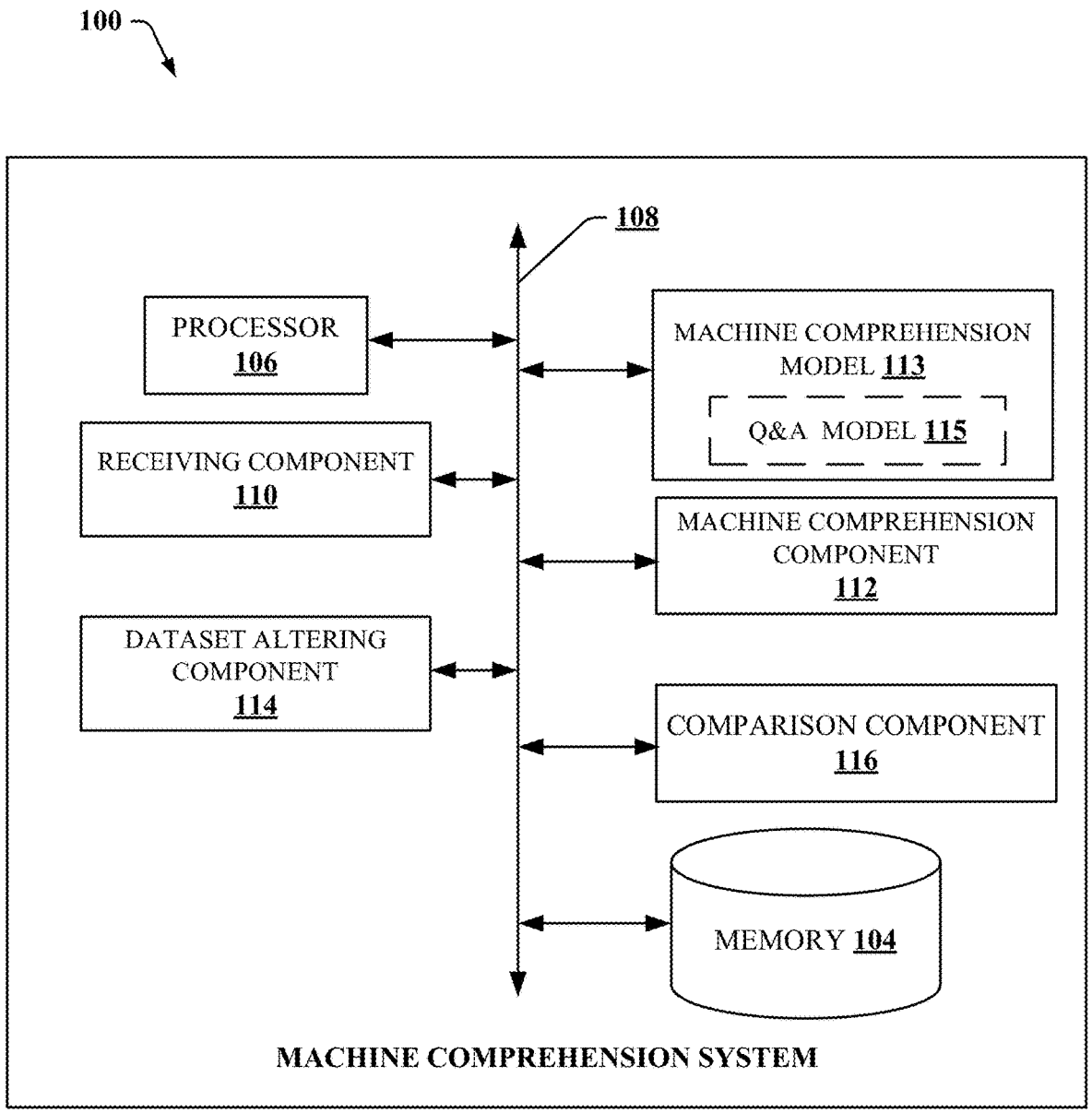
FIG. 1 illustrates a block diagram of an example, non-limiting system that can facilitate determination of veracity of machine comprehension system responses, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however in various cases, that the one or more embodiments can be practiced without these specific details.

Machine comprehension systems rely on question and answer models to facilitate processing large textual datasets to identify answers contained in the datasets to queries. A user or other entity can submit a query to the machine comprehension system and receive an answer to the query. The question and answer models in machine comprehension systems use machine learning, e.g., such as deep learning, to facilitate extraction of an answer to a query from a text corpus. For example, the question and answer model can be a transformer deep learning model.

Machine comprehension systems can capture a text corpus comprising documents related to one or more topics. The system extracts answers to received queries from the text corpus. The machine comprehension system can extract the answer from a specific passage of the text corpus. Machine comprehension systems sometimes extract a correct answer to the query from the text corpus, but sometimes extract a nonsensical answer. This often occurs when the correct answer to a query is not present in the text corpus.

Machine comprehension systems are typically designed so that the system will always produce some answer, regardless of whether the answer exists in the text corpus.

Machine comprehension systems often assign confidence scores to the answers produced by the system. When the machine comprehension system produces a nonsensical answer to a query because the answer was not present in the text corpus, the system may assign a high confidence score to the answer despite its inaccuracy. The confidence scores may be calculated based on an assumption that the text corpus contains a correct answer to all possible queries; this reduces overall reliability of the machine comprehension system. When the answer to the query is not present in a text corpus, a machine comprehension system should return an inconclusive response to the query. The production of nonsensical answers and the corresponding high confidence scores reduces overall reliability of the machine comprehension systems.

A typical machine comprehension system can extract answers to questions from a large volume of information. The system, however, lacks capacity to identify when an answer to a query is not present in a text corpus, so the system may produce a high confidence score for a nonsensical answer. When an answer to a query is absent from a text corpus, a machine comprehension system will still extract an answer from a passage within the text corpus. The extracted answer may be nonsensical as an answer to the query.

To address challenges of machine comprehension systems in recognizing nonsensical or incorrect answers resulting from absence of a correct answer to a query in a text corpus as described herein, one or more exemplary embodiments can generate a canned response that indicates the answer is not present to present to a user or other entity based on a veracity score determined from comparison of different answers to the query. A text corpus comprising documents related to one or more topics can be obtained. A machine comprehension component can generate a first answer to a query by extracting the answer from a passage of text corpus. The first answer can be stored in a memory. A text corpus alteration component can alter the text corpus one or more times to produce one or more altered text corpora. The machine comprehension component can extract one or more additional answers to the query from the altered text corpora. A comparison component can determine a veracity score for the first answer based on one or more comparisons of the first answer with the one or more additional answers. If the one or more comparisons between the first answer and the one or more additional answers show a high level of similarity between the first answer and the one or more additional answers, the comparison component will determine a high veracity score for the first answer. If the one or more comparisons between the first answer and the one or more additional answers show a low level of similarity between the first answer and the one or more additional answers, the comparison component will determine a low veracity score for the first answer.

A selection component can compare the veracity score of the first answer to a threshold value. When the veracity score exceeds the threshold value, the system can output the first answer as the answer to the query to the user or other entity. When the veracity score does not exceed the threshold value, the system can output a canned response that indicates the answer is not present to the query to the user or other entity. The canned response can be, for example, "N/A" or "Answer not found."

One or more embodiments of the subject disclosure is directed to computer processing systems, computer-implemented methods, apparatus and/or computer program products that facilitate efficiently, effectively, and automatically (e.g., without direct human involvement) generating accurate responses to a query submitted to a machine comprehension system based on a veracity score. The computer processing systems, computer-implemented methods, apparatus and/or computer program products can employ hardware and/or software to solve problems that are highly technical in nature (e.g., adapted to perform automated generation of a veracity score of an answer to a query, adapted to generate and/or employ one or more different detailed, specific and highly-complex models) that are not abstract and that cannot be performed as a set of mental acts by a human. For example, a human, or even thousands of humans, cannot efficiently, accurately and effectively manually gather and analyze thousands of data elements related to a variety of topics in a real-time network-based computing environment to generate accurate responses to a query submitted to a machine comprehension system based on a veracity score. One or more embodiments of the subject computer processing systems, methods, apparatuses and/or computer program products can enable the automated generation of accurate responses to a query submitted to a machine comprehension system based on a veracity score. Additionally, the nature of the problem solved is inherently related to technological advancements in Internet-based media and/or transactions that have not been previously addressed in this manner.

By way of overview, aspects of systems apparatuses or processes in accordance with the present invention can be implemented as machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

One or more embodiments are now described with reference to the drawings, where like referenced numerals are used to refer to like elements throughout. As used herein, the term "entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
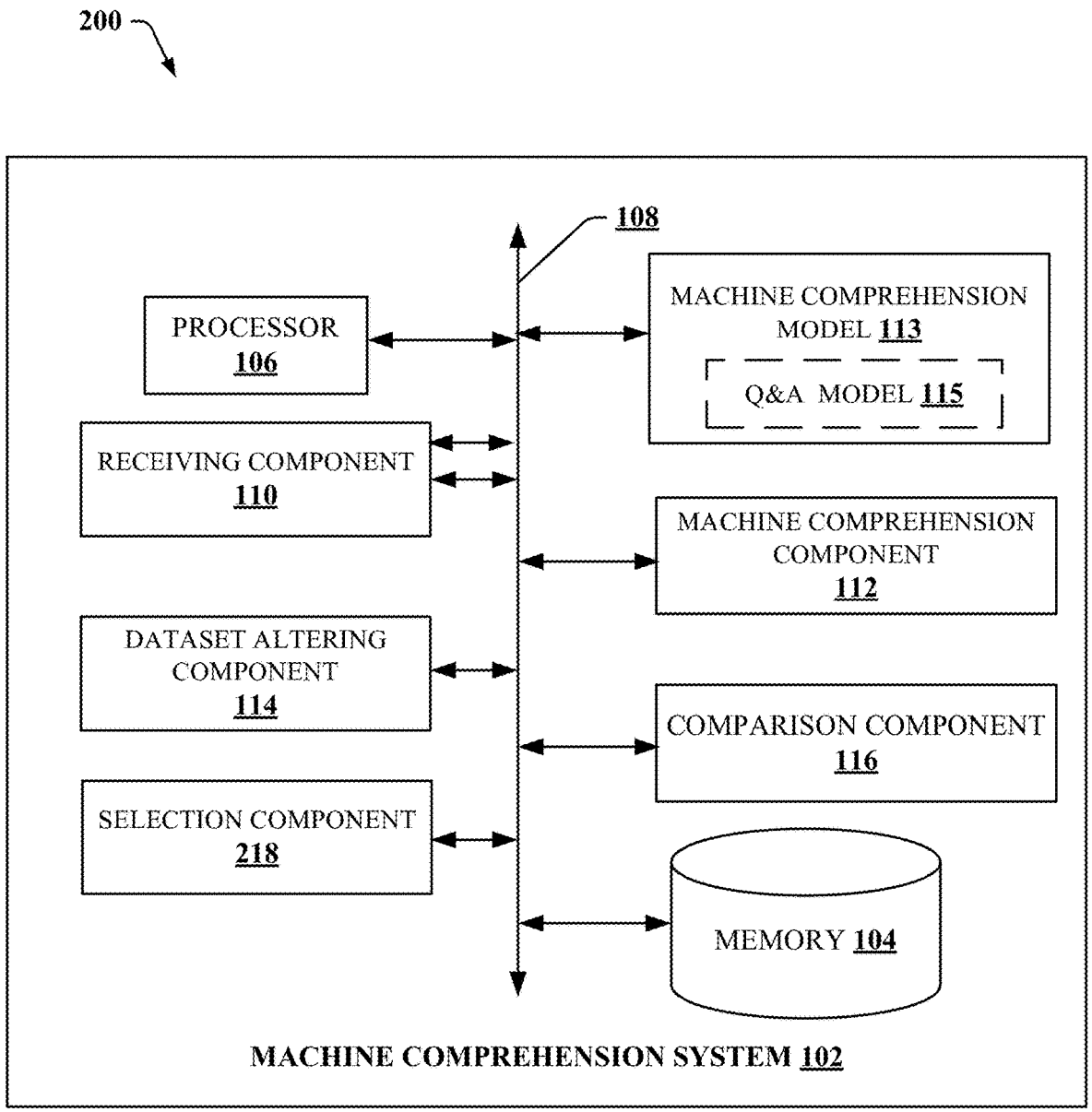
FIG. 2 illustrates another block diagram of an example, non-limiting system that can facilitate determination of veracity of machine comprehension system responses, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

FIG. 1 illustrates a block diagram of an example, non-limiting machine comprehension system 100 that facilitates determination of the veracity of machine comprehension question and answer models in accordance with one or more embodiments described herein. As illustrated at FIG. 1, the machine comprehension system 100 can comprise one or more components, such as a memory 104, processor 106, bus 108, receiving component 110, machine comprehension component 112, text corpus alteration component 114, and/or comparison component 116. Generally, machine comprehension system 100 can facilitate, in response to a query, recognizing nonsensical or incorrect answers resulting from the absence of a correct answer to a query in a text corpus and generating either a correct answer or a canned response indicating that the answer is not present to the query.

One or more exemplary embodiments of the present invention can determine a veracity score to facilitate isolation of nonsensical answers resulting from the absence of an answer to a query in a text corpus associated with a machine comprehension system.

The receiving component 110 can receive a query to be answered based on a text corpus. The receiving component may receive the query from, for example, a user. The receiving component 110 may also receive the query from another entity. The machine comprehension component 112 can comprise a machine comprehension model 113. The machine comprehension model 113 can comprise a question and answer (Q&A) model 115. The question and answer model 113 may rely on machine learning, e.g., such as deep learning. In an embodiment, the question and answer model 115 can be a transformer deep learning model. The machine comprehension component 112 can determine a first answer to the query based on a text corpus obtained by the machine comprehension component 112. The machine comprehension component 112 can extract a first answer to a query from a text corpus. A first answer can be stored by the system. In an embodiment, the machine comprehension component 112 can identify a specific passage of the text corpus from which it extracted the first answer to the query. A passage of the text corpus can be, for example, a document, a page, a paragraph, a sentence, or a collection of written lines.

A text corpus alteration component 114 can alter the text corpus one or more times to generate one or more altered text corpora. In an embodiment, the text corpus alteration component 114 can alter the text corpus to generate an altered text corpus of the altered text corpora by altering only the specific passage of the text corpus from which the machine comprehension component 112 extracted the first answer. The text corpus alteration component 114 can generate one or more altered text corpora while preserving the semantics of the text corpus. For example, the text corpus alteration component 114 can slightly perturb the text corpus or a passage of the text corpus as described in more detail in reference to FIG. 4. In another example, the text corpus alteration component 114 can perform abstractive summarization on the text corpus or a passage of the text corpus as described in more detail in reference to FIG. 5. In another example, the text corpus alteration component 114 can perform extractive summarization on the text corpus or a passage of the text corpus as described in more detail in reference to FIG. 6. In another example, the text corpus alteration component 114 can perform a dropout method on the text corpus or a passage of the text corpus. An embodiment of the present invention may comprise all, none, or any combination of the example text corpus alteration methods. In an embodiment, the text corpus alteration component 114 can generate an altered text corpus for each text corpus alteration method.

The machine comprehension component 112 can extract one or more additional answers to the query based on the one or more altered text corpora. In an embodiment, the machine comprehension component 112 extracts a second answer to the query from a first altered text corpus of the altered text corpora. In another embodiment, the machine comprehension component 112 extracts a third answer to the query from a second altered text corpus of the altered text corpora. In an embodiment, additional answers (for example, a second answer, a third answer, etc.) can be stored by the system.

A comparison component 116 can compare a first answer with one or more of the additional answers to determine a veracity score for the first answer. The veracity score can be based on one or more similarity scores. The comparison component 116 can determine similarity scores by, for example, comparing the first answer with the second answer and comparing a first answer with a third answer. In an embodiment, the comparison component 116 can determine a first similarity score based on the comparison of the first answer with the second answer. Further, the comparison component can determine a second similarity score based on a comparison between the first answer and a third answer. The veracity score can be, for example, a weighted similarity score. A weighted similarity score can be, for example, a weighted value based on one or more similarity scores. In an embodiment, if the one or more additional answers are consistent with the first answer, then the first answer will be assigned a high veracity score. In another embodiment, if the one or more additional answers are not consistent with the first answer, then the first answer will be assigned a low veracity score.

The various devices (e.g., system 100) and components (memory 104, processor 106, receiving component 110, machine comprehension component 112, text corpus alteration component 114, comparison component 116 and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology.

FIG. 2 illustrates a block diagram of an example, non-limiting system 200 that facilitates determination of the veracity of a machine comprehension system in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

One or more exemplary embodiments of the present invention can determine a veracity score to facilitate isolation of nonsensical answers resulting from the absence of an answer to a query in a text corpus. The system 200 comprises a selection component 218. The selection component 218 can receive a veracity score from the comparison component 116 and compare it to a threshold value. For example, if the veracity score is less than the threshold value, the selection component 218 will select a canned response that indicates that the answer is not present to output as the answer to the query. For example, a canned response to the query can be "Answer not found." In another example, a canned response to the query can be "Question is not relevant." In another example, a canned response can direct the user or other entity to another information source from which a correct answer to the query may be obtained. For example, the canned response could direct the user or other entity to a human. In another example, if the veracity score is above a threshold value, then the selection component 218 can select the first answer to output as the answer to the query. In an embodiment, the answer can be displayed to a user on a display component (not shown).

FIG. 3A illustrates a non-limiting example of a passage of a text corpus, a query, an answer, and a confidence score. The passage contains the answer to the query and a correct answer is produced with a high confidence score.

FIG. 3B illustrates a non-limiting example of a passage of a text corpus, a query, an answer, and a confidence score. The passage does not contain the answer to the query. A nonsensical answer is produced with a high confidence score.

Figure 4:
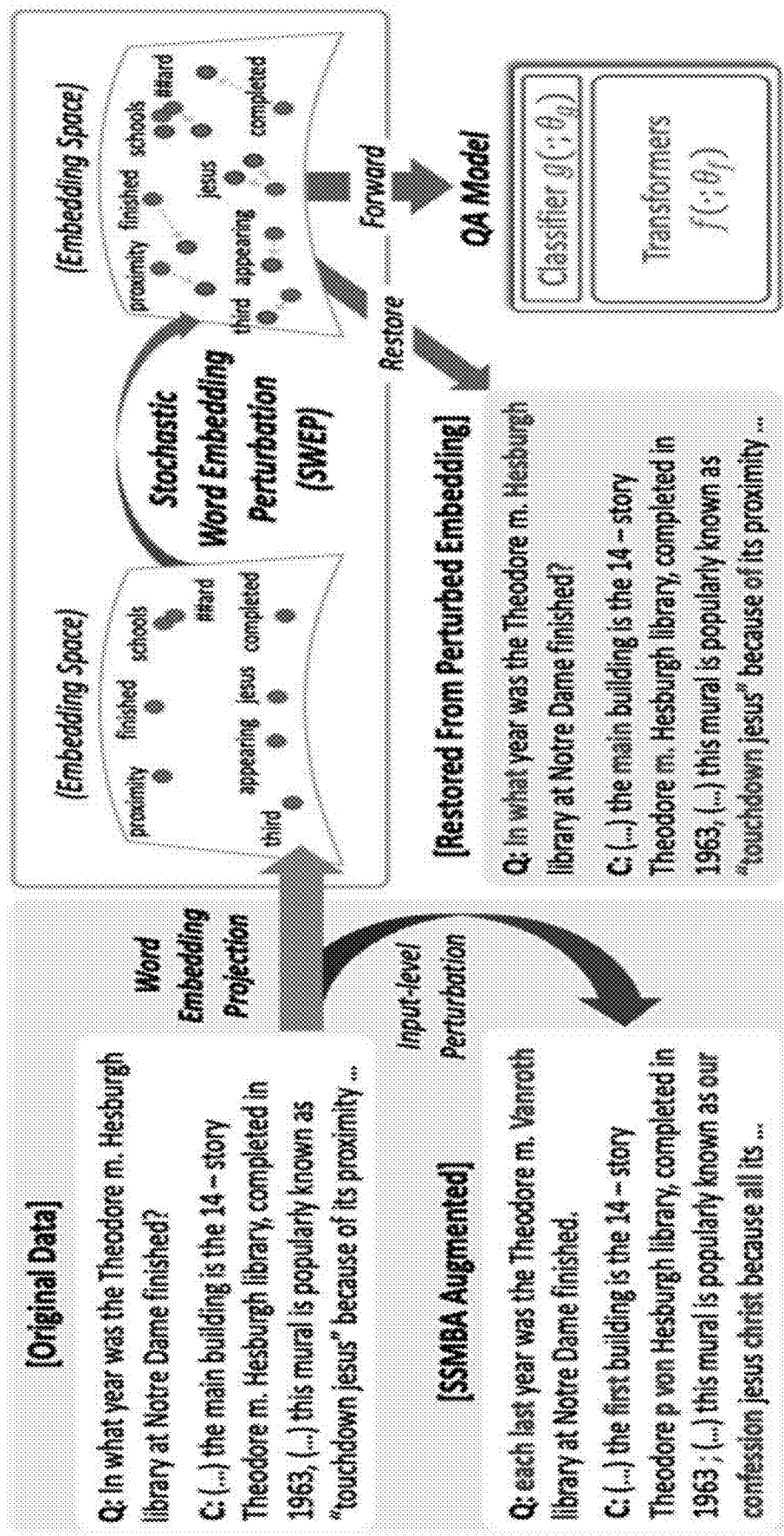
FIG. 4 illustrates a non-limiting example of dataset perturbation of a text corpus.

FIG. 4 illustrates a non-limiting example of a first text corpus alteration method that text corpus alteration component 114 can utilize. In an embodiment, the text corpus alteration component 114 can perturb the text corpus or a passage of the text corpus without altering the semantics of the text corpus to generate a first altered text corpus. For example, the contextual meaning of the text in the text corpus will remain the same, but there may be some changes in the words of the text. For example, some words in the document may be replaced with synonyms of those words. In another example, the locations of some words are changed within a passage. In an embodiment, the text corpus alteration component can utilize stochastic word embedding perturbation. In an embodiment, the machine comprehension component 112 can extract a second answer to the query based on the first altered text corpus to generate a second answer. The second answer can be stored in the memory.

Figure 5:
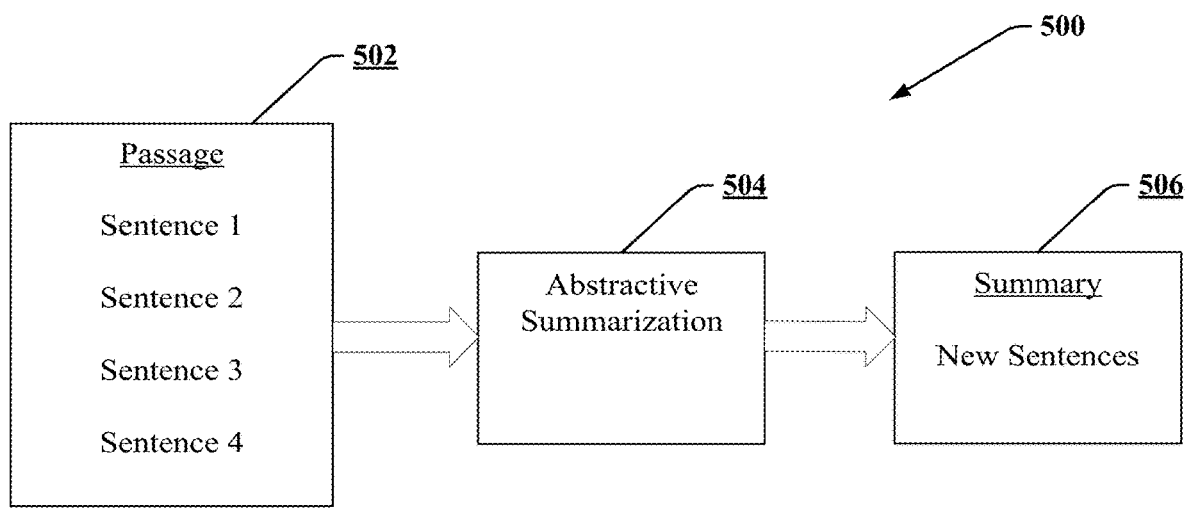
FIG. 5 illustrates a non-limiting example of abstractive summarization of a passage of a text corpus.

FIG. 5 illustrates a non-limiting example of a second text corpus alteration method that text corpus alteration component 114 can utilize. In an embodiment, the text corpus alteration component 114 can alter the text corpus or a passage 502 of the text corpus by abstractive summarization 504 without altering semantics of the text corpus to generate a second altered text corpus 506 of the altered text corpora. In an embodiment, the text corpus alteration component 114 can apply abstractive summarization 504 to a text corpus or a passage of a text corpus. For example, the machine comprehension component 112 can identify a passage of a text corpus from which it extracted the first answer. The text corpus alteration component 114 can perform abstractive summarization 504 on the passage to generate a summary of the content of the passage and preserve its contextual meaning. For example, in FIG. 5, a passage 502 consisting of four sentences is identified. An abstractive summarization process is performed on the passage 502 resulting in a second altered text corpus 506. In this example, the second altered text corpus 506 comprises one or more new sentences not comprised in the original text corpus. In an embodiment, the new sentences preserve the semantics of the text corpus. In an embodiment, the system can extract a third answer to the query based on the second altered text corpus produced by the abstractive summarization method described herein by the machine comprehension component 112. In an embodiment, the third answer can be stored by the system.

Figure 6:
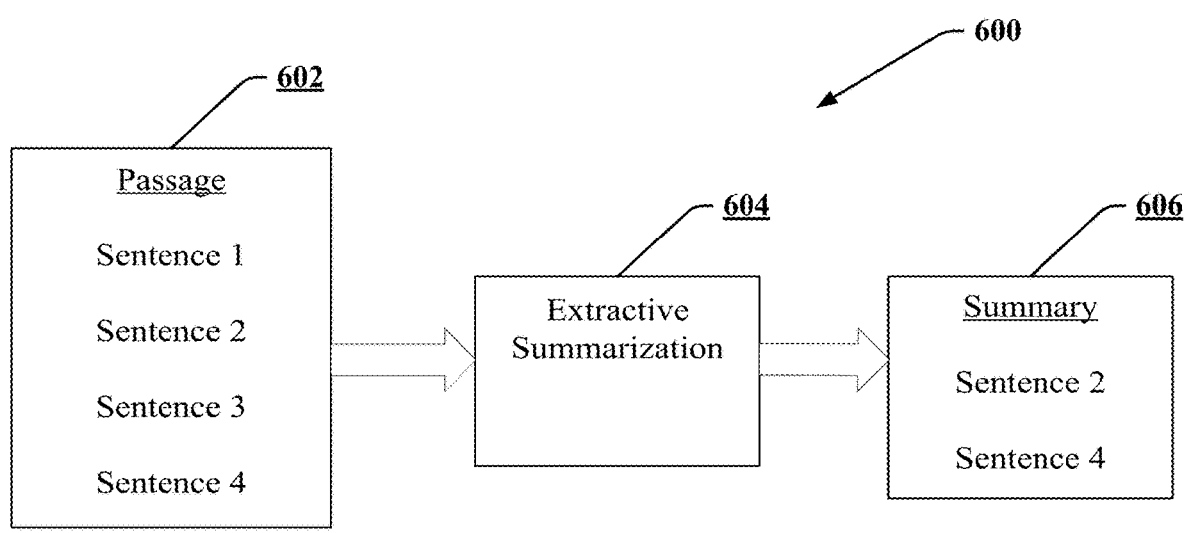
FIG. 6 illustrates a non-limiting example of extractive summarization of a passage of a text corpus.

FIG. 6 illustrates a non-limiting example of a third text corpus alteration method 600 that text corpus alteration component 114 can utilize. In an embodiment, the text corpus alteration component 114 can alter the text corpus or a passage 602 of the text corpus by extractive summarization 604 without altering the semantics of the text corpus to generate a third altered text corpus 606. In an embodiment, the text corpus alteration component 114 can apply extractive summarization 604 to a text corpus or a passage 602 of a text corpus. For example, the machine comprehension component 112 can identify a passage 602 of a text corpus from which it extracted the first answer. The text corpus alteration component 114 can perform extractive summarization 604 on the passage 602 to generate a summary of the content of the passage 602 and preserve its contextual meaning. For example, in FIG. 6, a passage 602 consisting of four sentences is identified. An extractive summarization 604 process is performed on the passage 602 resulting in a third altered text corpus 606. In this example, the third altered text corpus 606 comprises one or more sentences comprised in the original text corpus. In an embodiment, the chosen sentences preserve the semantics of the text corpus. In an embodiment, the system can extract a fourth answer to the query based on the third altered text corpus 606 produced by the extractive summarization method described herein by the machine comprehension component 112. In an embodiment, the fourth answer can be stored by the system.

In yet another embodiment, the text corpus alteration component 114 can utilize a fourth text corpus alteration method. In an embodiment, the text corpus alteration component 114 can alter the text corpus or a passage of the text corpus by a dropout method without altering the semantics of the text corpus to generate a fourth altered text corpus. In an embodiment, the text corpus alteration component 114 can apply a dropout method to a text corpus or a passage of a text corpus.

For example, the machine comprehension component 112 can identify a passage of a text corpus from which it extracted the first answer. The text corpus alteration component can perform a dropout method on the passage to generate a fourth altered text corpus on the content of the passage and preserve its contextual meaning. For example, a passage consisting of several words can be identified. A dropout process is performed on the passage resulting in a fourth altered text corpus. In this example, the fourth altered text corpus is a subset of the words included in the passage of the text corpus. In an embodiment, the chosen subset preserves the semantics of the text corpus. In an embodiment, the system can extract a fifth answer to the query based on the fourth altered text corpus produced by the dropout method described herein by the machine comprehension component 112. In an embodiment, the fourth answer can be stored by the system.

In an embodiment, the comparison component 116 can determine a veracity score of the first answer based on a comparison of the first answer with each of the additional answers, wherein the additional answers comprise the second answer, the third answer, the fourth answer, and the fifth answer. If the machine comprehension component 112 is properly extracting the correct answer from the original text, the similarity of the first answer to each of the second, third, fourth, and fifth answers will be high. The comparison component can calculate a similarity score between the first answer and the additional answers using a natural language processing (NLP) similarity method. For example, the NLP similarity method can be a cosine similarity calculation. In another example, NLP similarity method can be a Levenshtein distance. In another example, the NLP similarity method can be a Hamming distance.

In an embodiment, the comparison component 112 can use an NLP method to determine a similarity score between the first answer and the second answer to determine a first similarity score. The comparison component 112 can further use an NLP method to determine a similarity score between the first answer and the third answer to generate a second similarity score. The comparison component 112 can further use an NLP method to determine a similarity score between the first answer and the fourth answer to generate a third similarity score. The comparison component 112 uses an NLP method to determine a similarity score between the first answer and the fifth answer to generate a fourth similarity score. In an embodiment, the comparison component generates a weighted similarity score based on the first, second, third, and fourth similarity scores. In an embodiment, the weighted similarity score is the veracity score.

Figure 7:
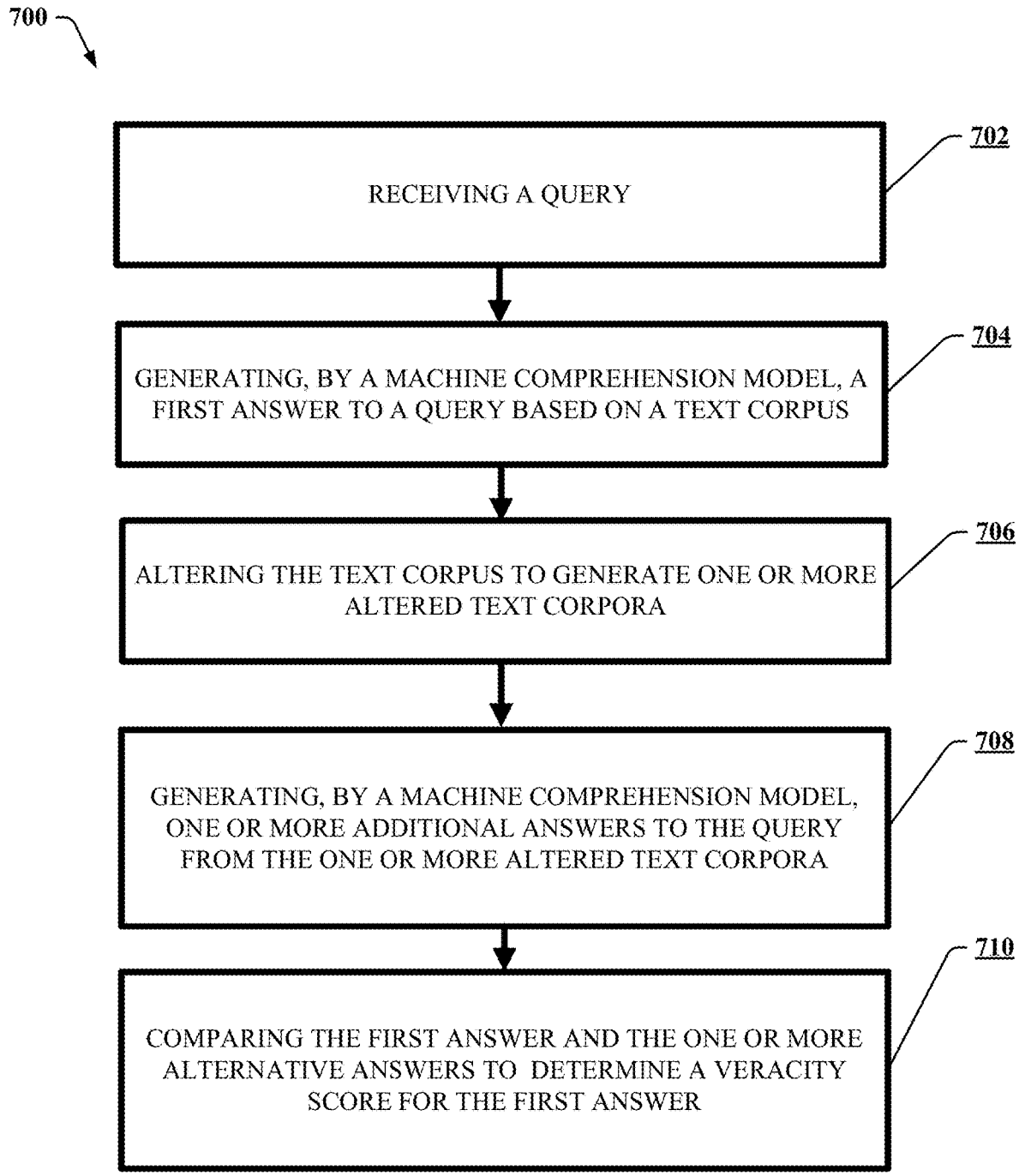
FIG. 7 illustrates a flow diagram of an example, non-limiting computer-implemented method in accordance with one or more embodiments described herein.

FIG. 7 illustrates a flow diagram of an example, non-limiting method 700 that can facilitate determination of the veracity of machine comprehension question and answer models, in accordance with one or more embodiments described herein, such as the non-limiting system 100 of FIG. 1. While the non-limiting method 700 is described relative to the non-limiting system 100 of FIG. 1, the non-limiting method 700 can be applicable also to other systems described herein, such as the non-limiting system 200 of FIG. 2. Repetitive description of like elements and/or processes employed in respective embodiments is omitted for sake of brevity. At 702, the non-limiting method 700 can comprise receiving, by a system (e.g., receiving component 110) operatively coupled to a processor, a query. The query can be from a user or another entity. At 704, the non-limiting method 700 can comprise generating, by the system (e.g., machine comprehension component 112), a first answer to a query based on a text corpus.

At 706, the non-limiting method 700 can comprise altering, by the system (e.g., text corpus alteration component 114), the text corpus to generate one or more altered text corpora. At 708, the non-limiting method 700 can comprise generating, by the system (e.g., machine comprehension component 112), one or more additional answers to the query based on the one or more altered text corpora. At 710, the non-limiting method 700 can comprise comparing, by the system (e.g., comparison component 116), the first answer and the one or more alternative answers to determine a veracity score for the first answer.

Figure 8:
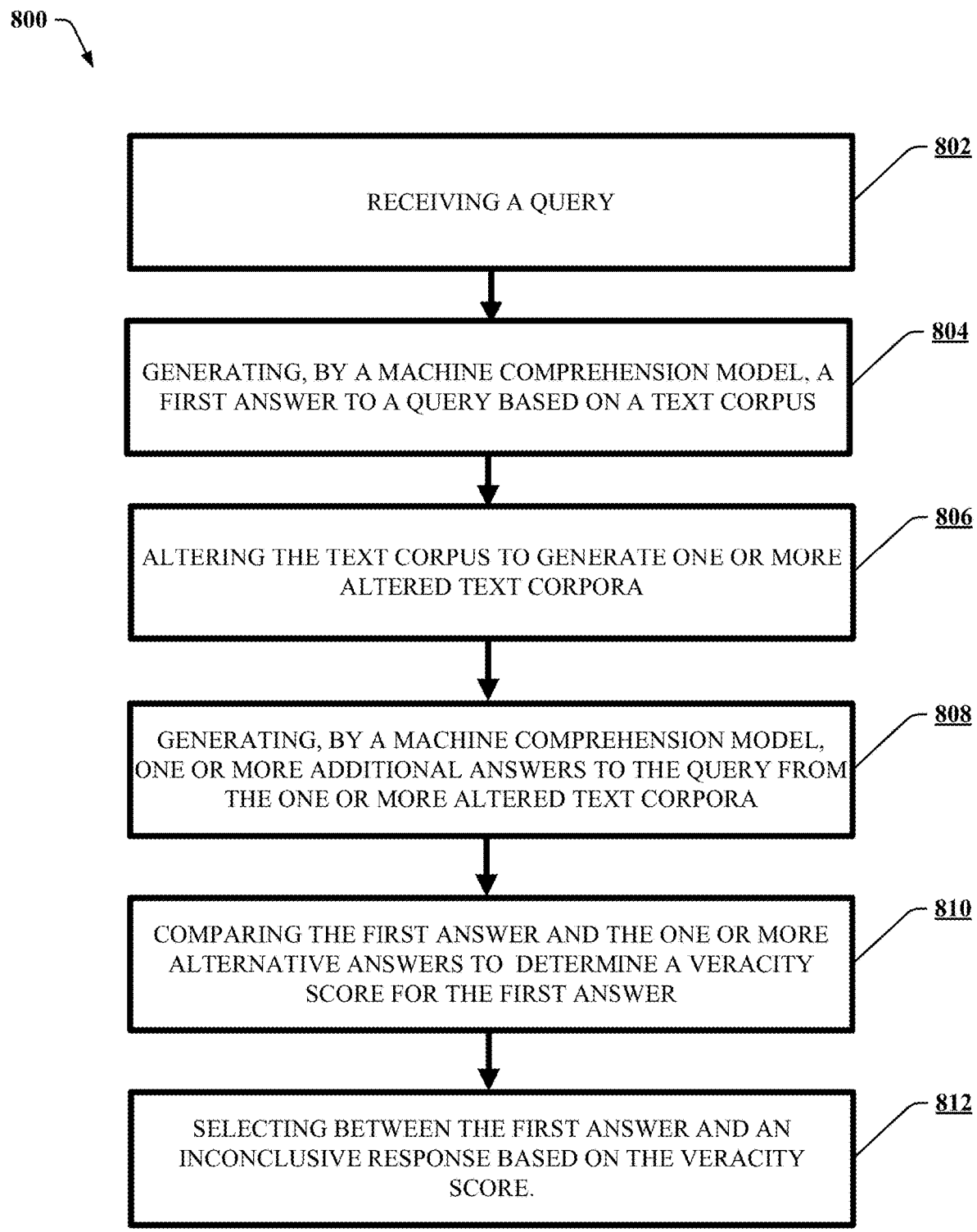
FIG. 8. illustrates a flow diagram of an example, non-limiting computer-implemented method in accordance with one or more embodiments described herein.

Next, FIG. 8 illustrates a flow diagram of an example, non-limiting method 800 that can facilitate determination of the veracity of machine comprehension question and answer models, in accordance with one or more embodiments described herein, such as the non-limiting system 200 of FIG. 2. While the non-limiting method 800 is described relative to the non-limiting system 200 of FIG. 2, the non-limiting method 800 can be applicable also to other systems described herein, such as the non-limiting system 100 of FIG. 1. Repetitive description of like elements and/or processes employed in respective embodiments is omitted for sake of brevity. At 802, the non-limiting method 800 can comprise receiving, by a system (e.g., receiving component 110) operatively coupled to a processor, a query. The query may be from a user or another entity. At 804, the non-limiting method 800 can comprise generating, by the system (e.g., machine comprehension component 112), a first answer to a query based on a text corpus. At 806, the non-limiting method 800 can comprise altering, by the system (e.g., text corpus alteration component 114), the text corpus to generate one or more altered text corpora. At 808, the non-limiting method 800 can comprise generating, by the system (e.g., machine comprehension component 112), one or more additional answers to the query based on the one or more altered text corpora. At 810, the non-limiting method 800 can comprise comparing, by the system (e.g., comparison component 116), the first answer and the one or more alternative answers to determine a veracity score for the first answer. At 812, the non-limiting method 800 can comprise selecting, by the system (e.g., selection component 218), between the first answer and a canned response that indicates that the answer is not present based on the veracity score.

Figure 9:
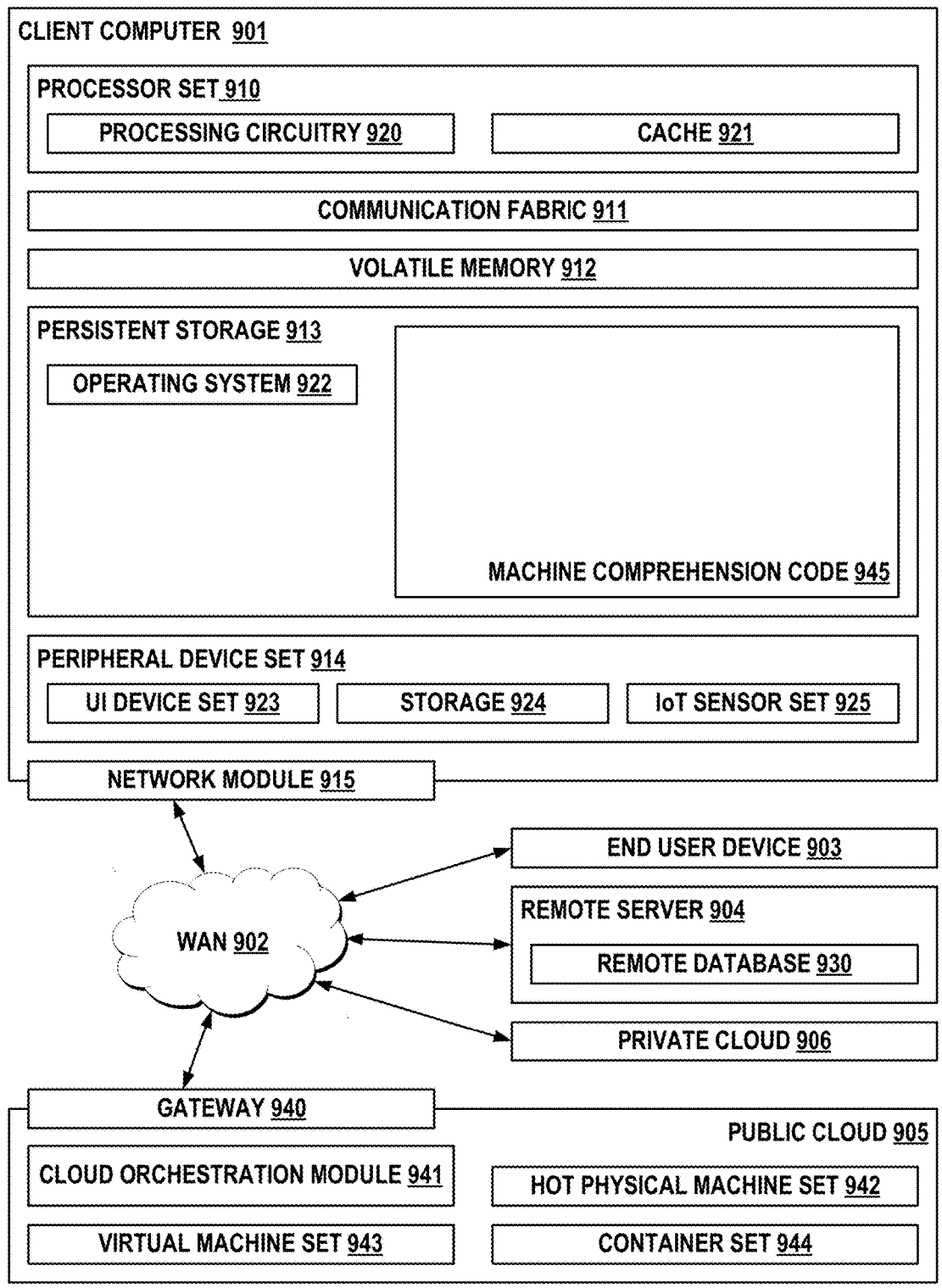
FIG. 9 illustrates a block diagram of an example, computing environment in which one or more embodiments described herein can be facilitated.

Turning next to FIG. 9, a detailed description is provided of additional context for the one or more embodiments described herein at FIGS. 1-8.

FIG. 9 and the following discussion are intended to provide a brief, general description of a suitable computing environment 900 in which one or more embodiments described herein at FIGS. 1-8 can be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as machine comprehension code 945. In addition to block 945, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 945, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 945 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes at least one of the computer executable components that:
receives a query;
alters a text corpus to produce one or more altered text corpora, wherein the one or more altered text corpora maintain semantic integrity of the text corpus and respectively introduce different modifications to the text corpus;
generates a first answer to the query based on the text corpus;
generates one or more additional answers based on the one or more altered text corpora;
compares the first answer with the one or more additional answers;
generates a respective similarity score for each comparison of the first answer with an additional answer of the one or more additional answers; and
generates a veracity score for the first answer based on the respective similarity scores, wherein the veracity score indicates a likelihood of the first answer being correct.

2. The system of claim 1, wherein the at least one of the computer executable components further:
generates, based on the veracity score, a response to the query comprising the first answer or a canned response indicating that a correct answer is not present to respond to the query.

3. The system of claim 1, wherein the at least one of the computer executable components further:
perturbs the text corpus or a passage of the text corpus by stochastic word embedding perturbation to produce an altered text corpus of the one or more altered text corpora.

4. The system of claim 1, wherein the at least one of the computer executable components further:
summarizes the text corpus or a passage of the text corpus using an abstractive summarization technique to produce an altered text corpus of the one or more altered text corpora.

5. The system of claim 1, wherein the at least one of the computer executable components further:
summarizes the text corpus or a passage of the text corpus using an extractive summarization technique to produce an altered text corpus of the one or more altered text corpora.

6. The system of claim 1, wherein the at least one of the computer executable components further:
uses a dropout technique on the text corpus to produce an altered text corpus of the altered text corpora.

7. A computer-implemented method, comprising:
receiving, by a system operatively coupled to a processor, a query;
generating, by the system using a machine comprehension question and answer model, a first answer to the query based on a text corpus;
altering, by the system, the text corpus to produce one or more altered text corpora, wherein the one or more altered text corpora maintain semantic integrity of the text corpus and respectively introduce different modifications to the text corpus;
generating, by the system using the machine comprehension question and answer model, one or more additional answers to the query based on the one or more altered text corpora;
comparing, by the system, the first answer with the one or more additional answers;
generating, by the system, a respective similarity score for each comparison of the first answer with an additional answer of the one or more additional answers; and
generating, by the system, a veracity score for the first answer based on the respective similarity scores, wherein the veracity score indicates a likelihood of the first answer being correct.

8. The computer-implemented method of claim 7, further comprising:
generating, by the system, based on the veracity score, a response to the query comprising the first answer or a canned response indicating that a correct answer is not present to respond to the query.

9. The computer-implemented method of claim 7, wherein altering the text corpus comprises:
perturbing the text corpus or a passage of the text corpus by stochastic word embedding perturbation to produce an altered text corpus of the one or more altered text corpora.

10. The computer-implemented method of claim 7, wherein altering the text corpus comprises:
summarizing the text corpus or a portion of the text corpus using an abstractive summarization technique to produce an altered text corpus of the one or more altered text corpora.

11. The computer-implemented method of claim 7, wherein altering the text corpus comprises:
summarizing the text corpus or a portion of the text corpus using an extractive summarization technique to produce an altered text corpus of the one or more altered text corpora.

12. The computer-implemented method of claim 7, wherein altering the text corpus comprises:
using a dropout technique on the text corpus or a passage of the text corpus to produce an altered text corpus of the altered text corpora.

13. A computer program product facilitating determining the veracity of machine comprehension question and answer models, the computer program product comprising a computer readable storage medium having program instructions embodied therewith, the program instructions executable by a processor to cause the processor to:
receive, by the processor, a query;
generate, by the processor, a first answer to the query based on a text corpus from a machine comprehension question and answer model;
alter, by the processor, the text corpus to produce one or more altered text corpora, wherein the one or more altered text corpora maintain semantic integrity of the text corpus and respectively introduce different modifications to the text corpus;
generate, by the processor, one or more additional answers to the query based on the one or more altered text corpora from the machine comprehension question and answer model;
compare, by the processor, the first answer with the one or more additional answers;
generate, by the processor, a respective similarity score for each comparison of the first answer with an additional answer of the one or more additional answers; and determine, by the processor, a veracity score for the first answer based on the comparison, wherein the veracity score indicates a likelihood of the first answer being correct.

14. The computer program product of claim 13, wherein the program instructions are further executable by the processor to cause the processor to:
generate, by the processor, based on the veracity score, a response to the query comprising the first answer or a canned response indicating that a correct answer is not present to respond to the query.

15. The computer program product of claim 13, wherein the program instructions are further executable by the processor to cause the processor to:
perturb the text corpus or a passage of the text corpus by stochastic word embedding perturbation to produce an altered text corpus of the one or more altered text corpora.

16. The computer program product of claim 13, wherein the program instructions are further executable by the processor to cause the processor to:
summarize the text corpus or a passage of the text corpus using an abstractive summarization technique to produce an altered text corpus of the one or more altered text corpora.

17. The computer program product of claim 13, wherein the program instructions are further executable by the processor to cause the processor to:
summarize the text corpus or a passage of the text corpus using an extractive summarization technique to produce an altered text corpus of the altered text corpora.

18. The computer program product of claim 13, wherein the program instructions are further executable by the processor to cause the processor to:
use a dropout technique on the text corpus to produce an altered text corpus of the altered text corpora.

19. The system of claim 1, wherein the at least one of the computer executable components further:
compares the veracity score to a threshold value; and
generates the response to the query by:
including the first answer when the veracity score exceeds the threshold value; and
including the canned response indicating that a correct answer is not present when the veracity score does not exceed the threshold value.

20. The computer-implemented method of claim 7, further comprising:
comparing the veracity score to a threshold value; and
generating the response to the query by:
including the first answer when the veracity score exceeds the threshold value; and
including the canned response indicating that a correct answer is not present when the veracity score does not exceed the threshold value.

* * * * *